United States Patent
Itskovich et al.

(10) Patent No.: US 9,588,250 B2
(45) Date of Patent: Mar. 7, 2017

(54) THREE-COIL SYSTEM WITH SHORT NONCONDUCTIVE INSERTS FOR TRANSIENT MWD RESISTIVITY MEASUREMENTS

(75) Inventors: Gregory B. Itskovich, Houston, TX (US); Arcady Reiderman, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 1509 days.

(21) Appl. No.: 13/071,724

(22) Filed: Mar. 25, 2011

(65) Prior Publication Data

US 2011/0257886 A1    Oct. 20, 2011

Related U.S. Application Data

(60) Provisional application No. 61/324,069, filed on Apr. 14, 2010.

(51) Int. Cl.
| | | |
|---|---|---|
| *G01V 3/28* | (2006.01) | |
| *G01V 3/30* | (2006.01) | |
| *E21B 47/00* | (2012.01) | |
| *G01V 11/00* | (2006.01) | |

(52) U.S. Cl.
CPC .............. *G01V 3/28* (2013.01); *G01V 3/30* (2013.01); *E21B 47/00* (2013.01); *G01V 11/002* (2013.01)

(58) Field of Classification Search
USPC .................................................... 702/6, 7, 11
See application file for complete search history.

(56) References Cited

U.S. PATENT DOCUMENTS

| | | |
|---|---|---|
| 3,715,655 A | 2/1973 | Dowling et al. |
| 4,514,693 A | 4/1985 | Meador |
| 4,536,714 A | 8/1985 | Clark |
| 5,452,761 A | 9/1995 | Beard et al. |
| 5,574,374 A | 11/1996 | Thompson et al. |
| 5,814,988 A | 9/1998 | Itskovich et al. |
| 5,939,885 A | 8/1999 | McClure et al. |
| 5,955,884 A | 9/1999 | Payton et al. |
| 6,191,586 B1 | 2/2001 | Bittar |
| 6,646,441 B2 | 11/2003 | Thompson et al. |
| 6,714,014 B2 | 3/2004 | Evans et al. |
| 6,885,308 B2 | 4/2005 | Smith et al. |
| 6,891,376 B2 | 5/2005 | Hanstein et al. |
| 6,906,521 B2 | 6/2005 | Tabarovsky |

(Continued)

FOREIGN PATENT DOCUMENTS

| | | |
|---|---|---|
| EP | 0434439 A2 | 6/1991 |
| GB | 2100544 A | 12/1982 |

OTHER PUBLICATIONS

Resistivity of Steel, The Physics Factbook, Edited by Glenn Elert—Written by his students, http://hypertextbook.com/facts/2006/UmranUgur.shtml, 2 sheets.

(Continued)

*Primary Examiner* — Paul D Lee
(74) *Attorney, Agent, or Firm* — Mossman Kumar & Tyler PC

(57) ABSTRACT

A three-coil bucking system is used for determination of a formation resistivity property ahead of the drill bit. The conductive drill pipe is provided with non-conductive inserts in the proximity of at least one transmitter and at least two receivers. Transient electromagnetic signals are processed to give the estimate of the resistivity property and for geosteering.

15 Claims, 12 Drawing Sheets

(56) References Cited

U.S. PATENT DOCUMENTS

| | | |
|---|---|---|
| 7,027,922 B2 | 4/2006 | Bespalov et al. |
| 7,046,009 B2 | 5/2006 | Itskovich |
| 7,150,316 B2 | 12/2006 | Itskovich |
| 7,167,006 B2 | 1/2007 | Itskovich |
| 7,525,315 B2 | 4/2009 | Fredette et al. |
| 2002/0043976 A1 | 4/2002 | Holladay, III et al. |
| 2003/0076107 A1 | 4/2003 | Fanini et al. |
| 2004/0027130 A1 | 2/2004 | Ellingsrud et al. |
| 2004/0124842 A1 | 7/2004 | Eidesmo et al. |
| 2004/0183538 A1 | 9/2004 | Hanstein et al. |
| 2005/0017722 A1 | 1/2005 | Ellingsrud et al. |
| 2005/0024057 A1 | 2/2005 | Desplats et al. |
| 2005/0077902 A1 | 4/2005 | MacGregor et al. |
| 2005/0167100 A1 | 8/2005 | Itskovich |
| 2006/0017442 A1 | 1/2006 | Folberth |
| 2006/0017443 A1 | 1/2006 | Folberth et al. |
| 2006/0038570 A1 | 2/2006 | Constable |
| 2006/0061364 A1 | 3/2006 | Banning et al. |
| 2006/0091889 A1 | 5/2006 | Ellingsrud et al. |
| 2006/0132137 A1 | 6/2006 | MacGregor et al. |
| 2007/0108981 A1 | 5/2007 | Banning-Geertsma et al. |
| 2007/0216416 A1 | 9/2007 | Itskovich |
| 2009/0160448 A1 | 6/2009 | Hall et al. |
| 2009/0237084 A1 | 9/2009 | Itskovich |
| 2010/0097065 A1 | 4/2010 | Itskovich et al. |

OTHER PUBLICATIONS

Resistivity of Copper, The Physics Factbook, Edited by Glenn Elert—Written by his students, http://hypertextbook.com/facts/2004/BridgetRitter.shtml, 2 sheets.

THREE-COIL SYSTEM WITH SHORT NONCONDUCTIVE INSERTS FOR TRANSIENT MWD RESISTIVITY MEASUREMENTS

CROSS-REFERENCES TO RELATED APPLICATIONS

This application claims priority from U.S. provisional patent application Ser. No. 61/324,069 filed on Apr. 14, 2010.

BACKGROUND OF THE DISCLOSURE

1. Field of the Disclosure

This disclosure relates to the field of electromagnetic well logging. More specifically, the present disclosure is a method of reducing effects of conductive drill pipes on transient electromagnetic signals.

2. Description of the Related Art

Electromagnetic resistivity instruments can be used to determine the electrical conductivity of earth formations surrounding a wellbore. An important objective in Measurement-while-drilling (MWD) applications is the estimation of the distance from the drillbit to an interface in the earth formation that has a resistivity contrast across the interface. The interface may be a bed boundary and/or a fluid interface between a nonconducting fluid (such as a hydrocarbon) and a conductive fluid such as brine.

In a typical transient induction tool, current in the transmitter coil drops from its initial value $I_0$ to 0 at the moment $t=0$. Subsequently, measurements are taken while the rotating tool is moving along the borehole trajectory. The currents induced in the drilling pipe and in the formation (i.e. eddy currents) begin diffusing from the region close to the transmitter coil in all the directions surrounding the transmitter. These currents induce electromagnetic field components which can be measured by induction coils placed along the conductive pipe. Signal contributions due to the eddy currents in the pipe are considered to be parasitic since the signal due to these currents is much stronger than the signal from the formation. In order to receive a signal which is substantially unaffected by the eddy currents in the pipe, one can measure the signal at the very late stage, at a time in which the signals from the formation dominate parasitic signals due to the pipe. Although the formation signal dominates at the late stage, it is also very small, and reliable measurement can be difficult.

In prior methods, increasing the distance between transmitter and receivers has been used to reduce the influence of the pipe and shift the dominant contribution of the formation to the earlier time range. Besides having limited resolution with respect to an oil/water boundary, such a system requires considerable length (up to 10-15 m). Such large distances are not desirable or convenient for an MWD tool.

There is a need to reduce the parasitic signals cause by eddy currents in transient field signal detection methods without increasing a distance between transmitter and receiver. The present disclosure fulfills that need.

SUMMARY OF THE DISCLOSURE

One embodiment of the disclosure is an apparatus for evaluating an earth formation. The apparatus includes: a carrier including at least one transmitting antenna and at least two spaced-apart receiving antennas configured to be conveyed in a borehole, the carrier including a conductive tubular and a non-conductive insert in the conductive tubular encompassing at least one of the at least one transmitter antenna and the at least two spaced-apart receiver antennas; and at least one processor configured to: estimate a value of a resistivity property of the earth formation using first and second transient signals produced by a first one and a second one of the at least two spaced-apart receiver antennas respectively responsive to a transient activation of the at least one transmitter antenna.

Another embodiment of the disclosure is a method of evaluating an earth formation. The method includes: conveying a carrier including at least one transmitting antenna and at least two spaced-apart receiving antennas configured in a borehole, the carrier including a conductive tubular and a non-conductive insert in the conductive tubular encompassing at least one of the at least one transmitter antenna and the at least two spaced-apart receiver antennas; activating the at least one transmitter and producing first and second transient signals in a first one and a second one of the at least two receiver antennas respectively; and using at least one processor for: estimating a value of a resistivity property of the earth formation using the first transient signal and the second transient signal.

Another embodiment of the disclosure is a non-transitory computer-readable medium product having thereon instructions that when executed by at least one processor cause the at least one processor to perform a method. The method includes: estimating a value of a resistivity property of an earth formation using a first transient signal and a second transient signal produced by a first one and a second one of at least two spaced-apart receivers on a carrier conveyed in a borehole responsive to an activation of at least one transmitter on the carrier, the carrier including a conductive tubular and a non-conductive insert in the conductive tubular encompassing at least one of the at least one transmitter antenna and the at least two spaced-apart receiver antennas.

BRIEF DESCRIPTION OF THE DRAWINGS

The present disclosure is best understood with reference to the attached drawings in which like numerals refer to like elements, and in which.

DESCRIPTION OF SPECIFIC EMBODIMENTS

Figure 1:
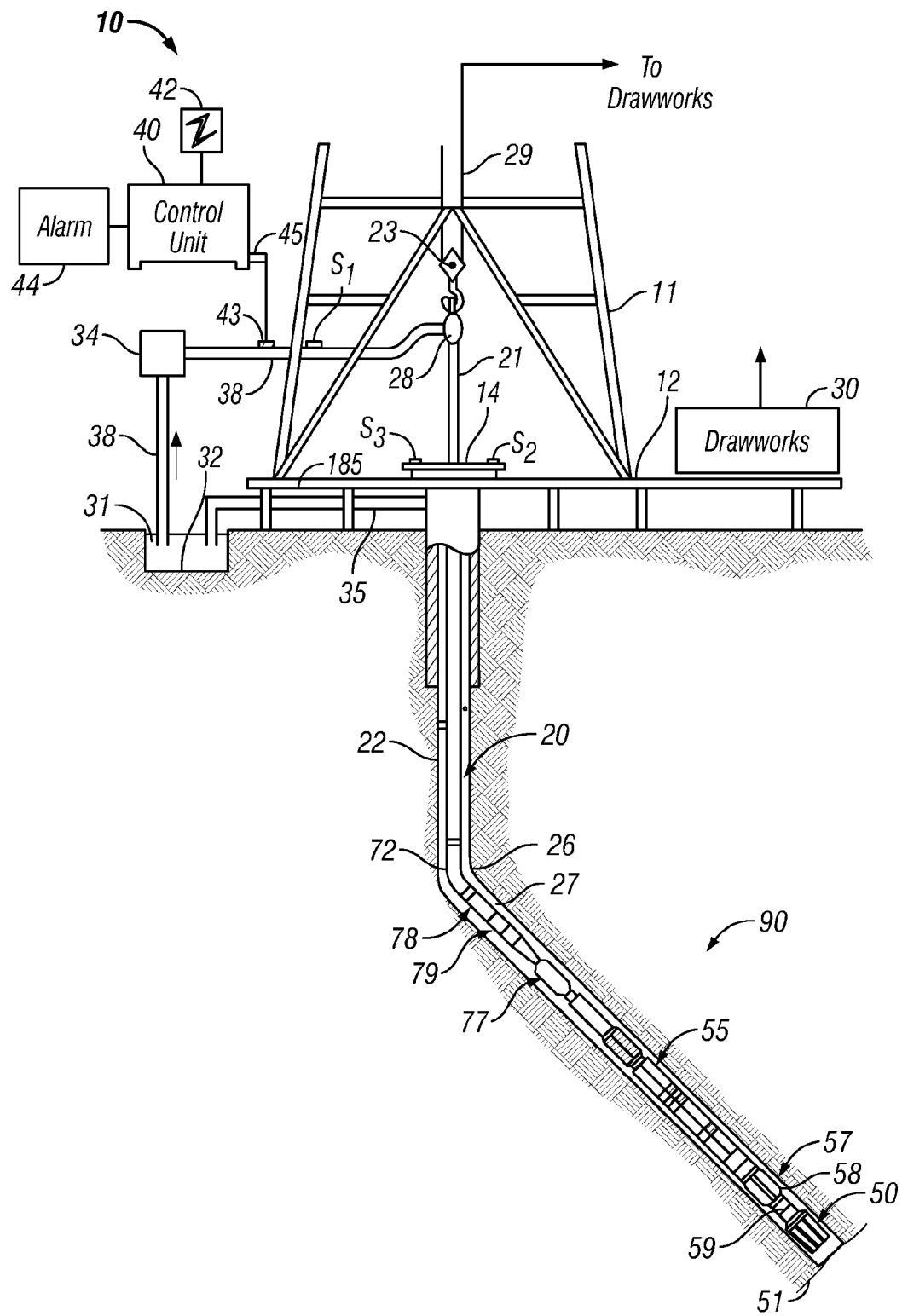
FIG. 1 shows a measurement-while-drilling tool suitable for use with the present disclosure.

FIG. 1 shows a schematic diagram of a drilling system 10 with a drillstring 20 carrying a drilling assembly 90 (also referred to as the bottomhole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ may be placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In one embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters may include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 may include a computer or a microprocessor-based processing system, memory for storing programs or models and data, a recorder for recording data, and other peripherals. The control unit 40 may be adapted to activate alarms 44 when certain unsafe or undesirable operating conditions occur.

Figure 2:
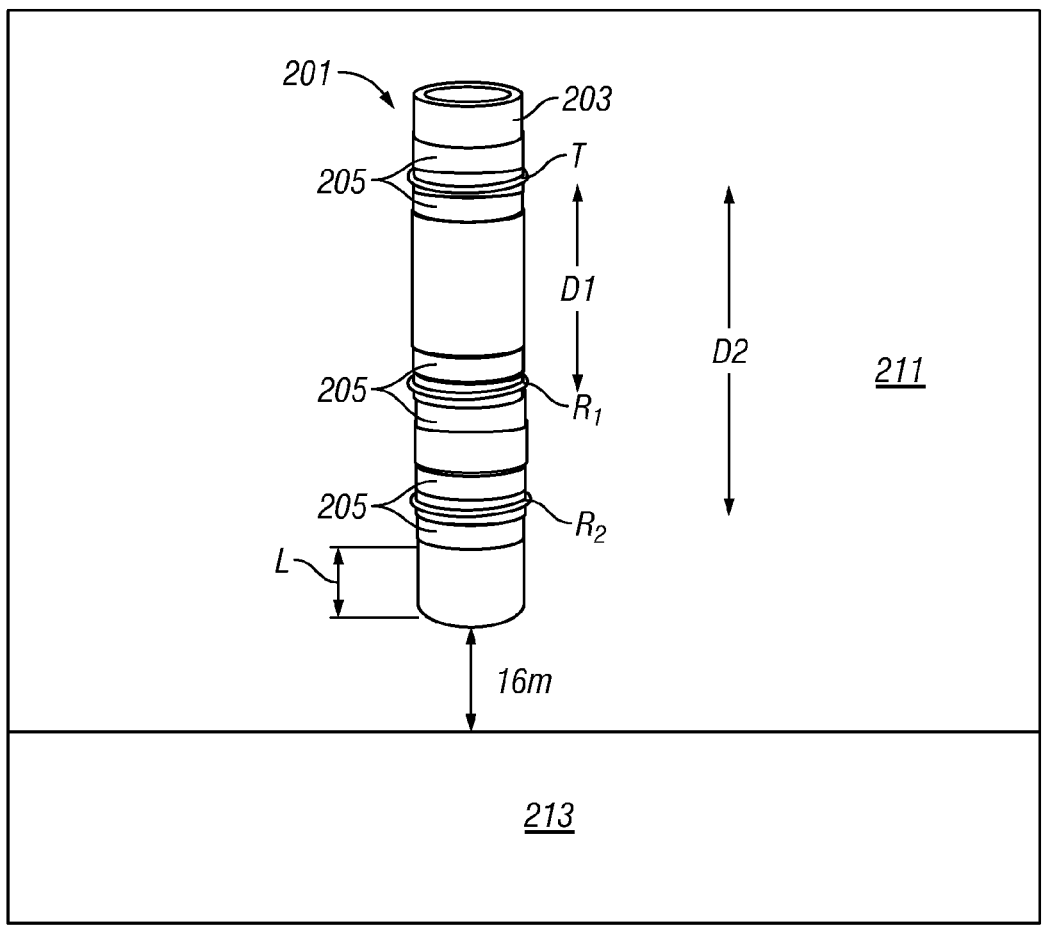
FIG. 2 shows a schematic diagram of some components of the tool of the present disclosure.

FIG. 2 shows a schematic diagram of a downhole carrier 201 according to the present disclosure. For MWD applications, the carrier 201 may be a BHA, while for wireline applications, the carrier may be a logging sonde conveyed on a wireline. The carrier 201 includes a conductive pipe 203 on which an axially oriented transmitter T antenna, i.e., the moment $M_z$ of the transmitter antenna is parallel to the longitudinal axis of the carrier. The orientation of the transmitter antenna is not to be construed as a limitation and other orientations may be used. The carrier also has two spaced apart receiver antennas denoted by $R_1$ and $R_2$. Current in the transmitter coil is switched from an initial value $I_0$ to 0 at the moment t=0. It should be noted that the reverse may also be done, i.e., switching the current from an initial value of 0 to a value of $I_0$ at time t=0.

The measurements are taken while the rotating tool is moving along the borehole trajectory. The eddy currents induced in the drilling pipe and formation currents begin diffusion from the region close to the transmitter coil in all the directions surrounding the transmitter. The eddy currents induced in the formation and in the drilling pipe induce an electromagnetic field, which is measured by the receiver antennas.

The contribution due to the eddy currents in the pipe is a parasitic signal, which at the time interval of the interest is stronger than the formation signal. In the present disclosure, a short (less than 1 m) part of the conductive drill pipe 203 is replaced with the nonconductive inserts 205 near the transmitter and the receivers. These inserts reduce the intensity of the eddy currents in the vicinity of both transmitting and receiving antennas and, as a result, diminish the parasitic effect from the drill. Additional reduction of the drill parasitic effect is achieved by using bucking of the signal. By utilizing short nonconductive inserts in the three-coil bucked system, eddy currents in the portion of the metal drill replaced with the inserts are substantially reduced while still providing efficient induction excitation of the eddy currents in the formation.

Figure 3:
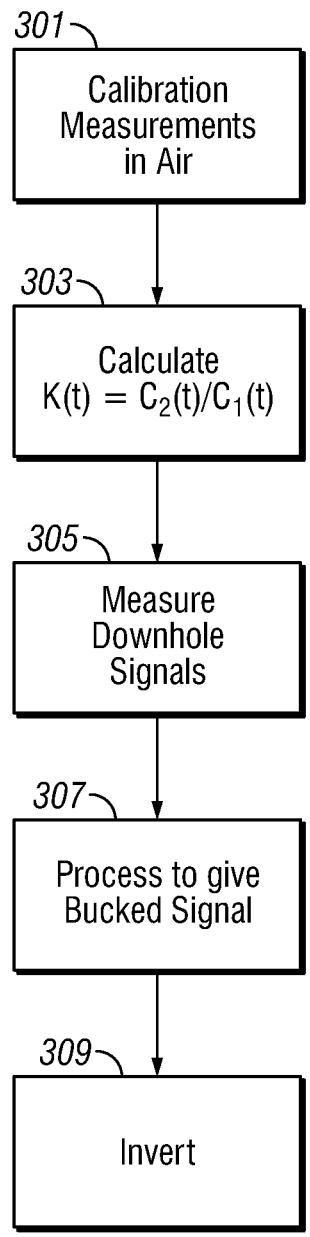
FIG. 3 gives a flow chart of some of the steps of the method of the present disclosure.

Turning now to FIG. 3, a flow chart of some of the steps of the method of the present disclosure are shown. Following the method disclosed in U.S. Pat. No. 7,150,316 to Itskovich, having the same assignee as the present disclosure and the contents of which are incorporated herein by reference, transient calibration measurements are made 301 in a homogenous zone such as in air (i.e., with no formation around) and two signals $C_1(t)$ and $C_2(t)$ are received in the receivers $R_1$ and $R_2$. Next 303, a time-dependent coefficient $$K(t)=C_2(t)/C_1(t) \quad (1)$$

is calculated using a processor. Steps 301 and 303 comprise a bucking mode. Next 305, downhole transient measurements are made and two signals $S_1(t)$ and $S_2(t)$ are acquired. Next, a processor is used to process the two signals $S_1(t)$ and $S_2(t)$ to estimate the differential (bucked) signal $\Delta S(t)$ 307 according to the equation $$\Delta S(t)=S_2(t)-K(t) \cdot S_1(t)$$

Steps 305 and 307 constitute the main operational mode. Next, an inversion of the differential (bucked) signal $\Delta S(t)$ is done 309 giving a result that is substantially unaffected by the conductive pipe to find parameters of the surrounding formation. The estimated parameters may include a formation resistivity, a formation conductivity, a formation dielectric constant, a distance to an interface such as water-oil contact, and/or a distance to a bed boundary ahead of the drill formation.

Figure 4:
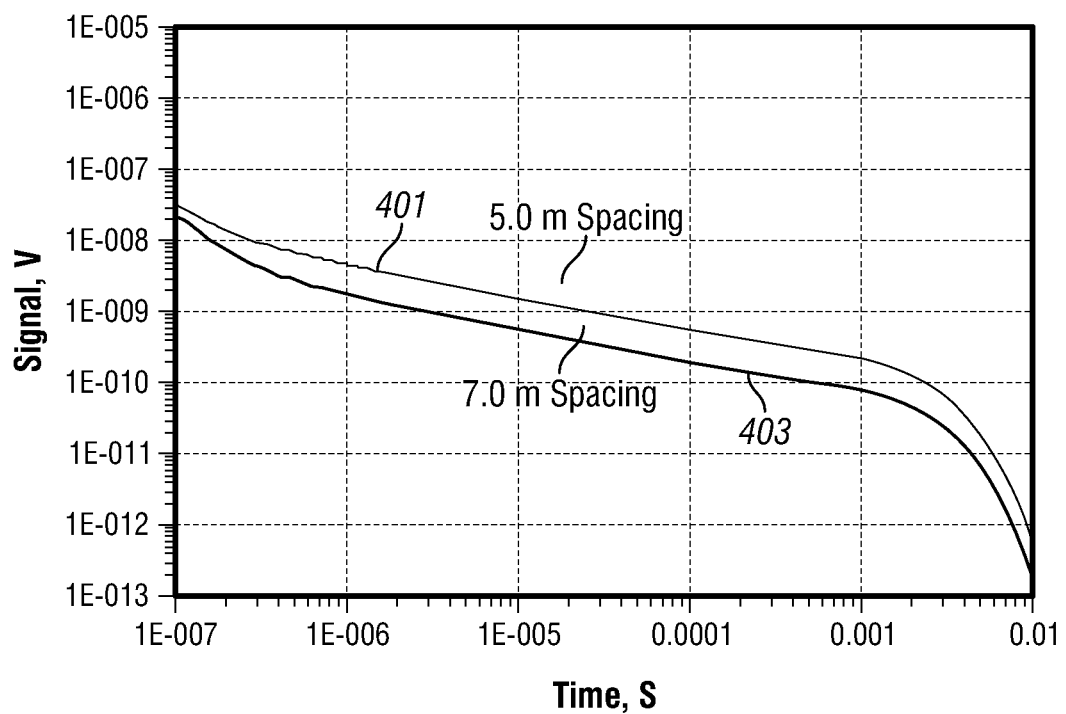
FIG. 4 shows modeling results for the 3-coil arrangement in case when no nonconductive insert and no bucking is used.

To illustrate the effectiveness of the described approach, numerical modeling results for a transient system placed in a vertical well in a two-layered formation are presented. The carrier 201 is placed in a resistive upper half-space of resistivity 50 $\Omega$-m having a boundary with a half-space with resistivity 1 $\Omega$-m (FIG. 2) placed at a distance of 16 m below the drill bit. The parameters of the model used in the modeling were the following:
Pipe radius=7 cm;
Pipe thickness=3 cm;
Resistivity of drill=$0.714 \times 10^{-6}$ $\Omega$-m;
Length of nonconductive insert=0.75 m;
Transmitter/Receiver coils radius=8.5 cm;
Resistivity of resistive layer $R_{01}$=50 $\Omega$-m; and
Resistivity of conductive layer $R_{02}$=1 $\Omega$-m FIG. 4 shows modeling results for the 3-coil arrangement in case when there is no nonconductive insert and no bucking. Signals are calculated at distances of 5 m and 7 m from the transmitter when there is no conductive formation in the model (signal in the air). The signals are used to calculate the bucking coefficient for the structure with no inserts. The bucking coefficient is a time-dependent coefficient relating the responses of the two receivers in a homogenous medium.

Figure 5:
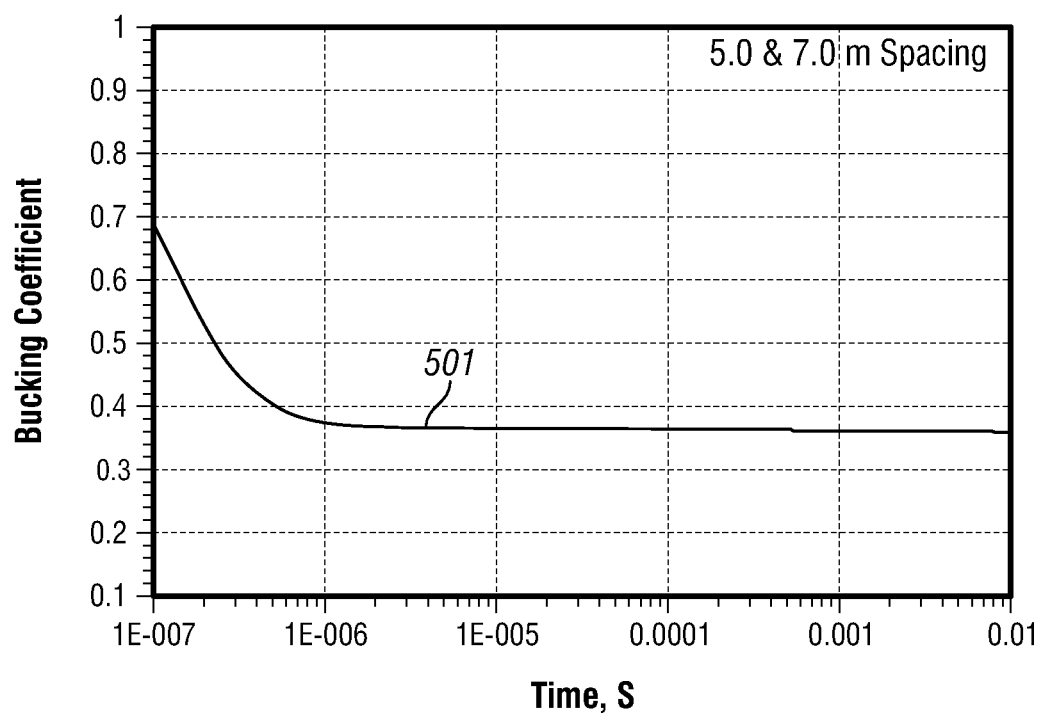
FIG. 5 shows the time dependent bucking coefficient derived from combination of signals at 5 and 7 m correspondingly for the structure with no inserts in FIG. 4.
Figure 6:
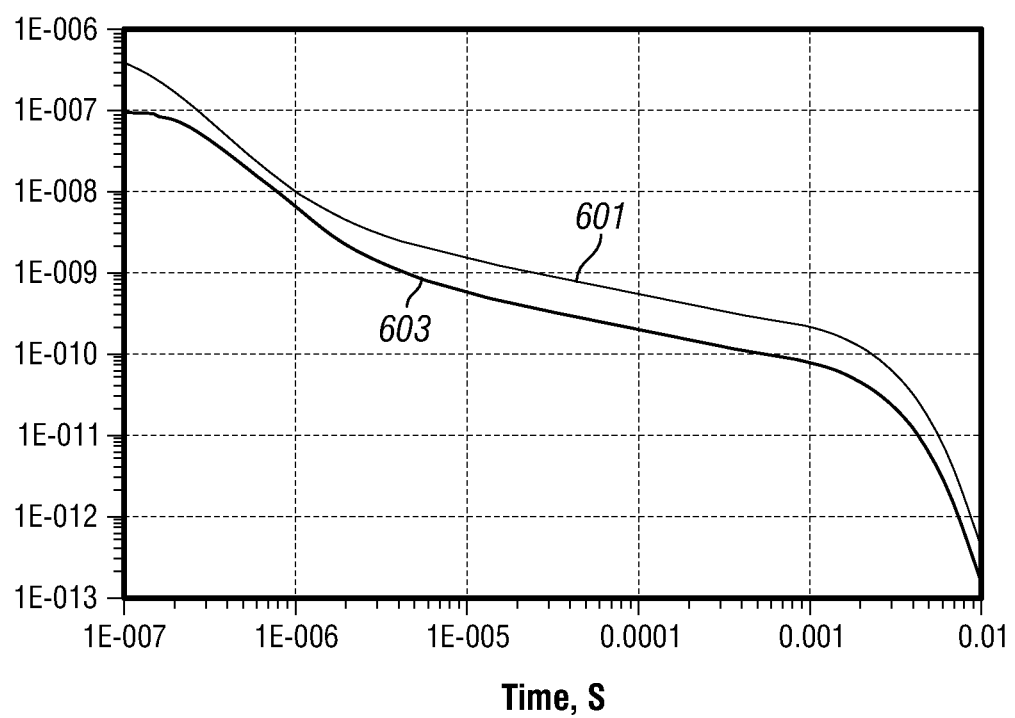
FIG. 6 shows the transient unbucked curves are shown for the case when a boundary having a resistivity contrast is placed at the distance of 16 m from the drill bit.

FIG. 5 shows the time-dependent bucking coefficient derived from combination of signals at 5 and 7 m correspondingly for the structure with no inserts. In FIG. 6, the transient unbucked curves are shown for the case when a boundary having a resistivity contrast is placed at the distance of 16 m from the drill bit. The curve 601 is for the receiver at 5 m and the curve 603 is for the receiver spaced at 7 m from the transmitter.

Comparison of signals from FIG. 4 and FIG. 6 clearly demonstrates that in the time range bigger than 1 $\mu$s, the signal is mainly defined by the conductive drill and contribution from the far-located formation is very small. To extract the signal from the formation we perform bucking by combining signals from FIG. 6 according to eqn. (1).

Figure 7:
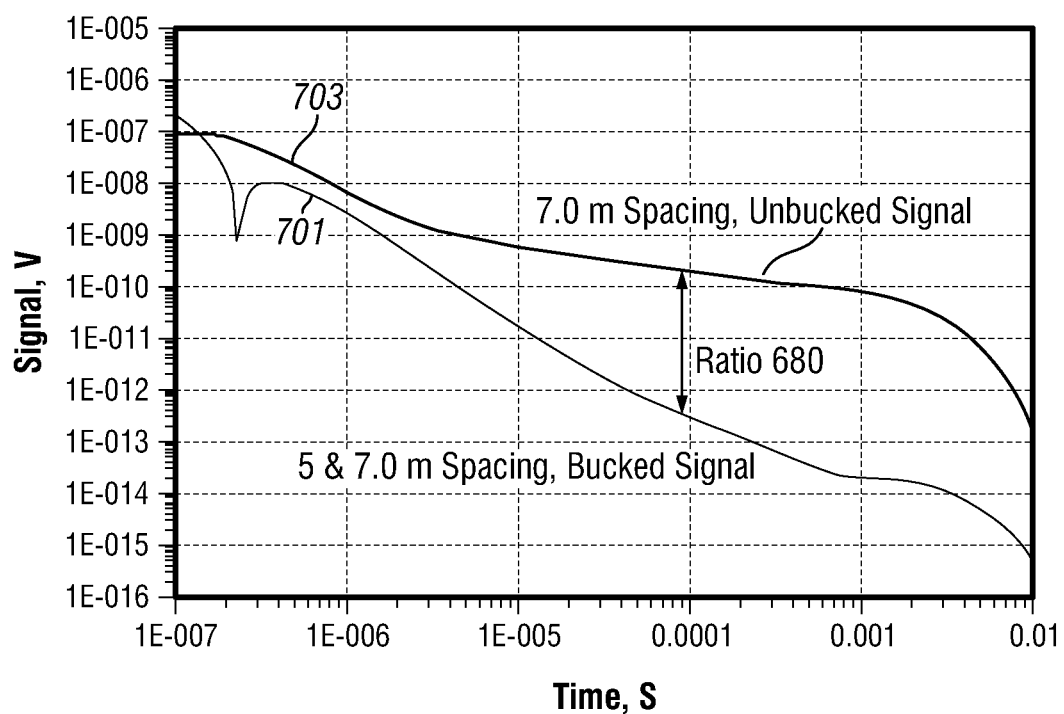
FIG. 7 shows the transient bucked curve and the unbucked curve for the case when the boundary is placed at the distance of 16 m from the drill bit.

FIG. 7 shows the transient bucked curve and the unbucked curve for the case when the boundary is placed at a distance of 16 m from the drill bit. The curve 703 is the unbucked curve for a 7 m spacing while the bucked signals for 5 m and 7 m 701 are almost identical. From this figure, dominance of the signal from the drill over the signal from the formation can be seen. Specifically, at a characteristic time moment of 100 $\mu$s shown in FIG. 7, the signal from the drill is 680 times bigger than the signal from the formation. Introduction of the nonconductive inserts serves the needs of reducing this ratio to the level when the signal from formation becomes extractable from the measurements.

Figure 8:
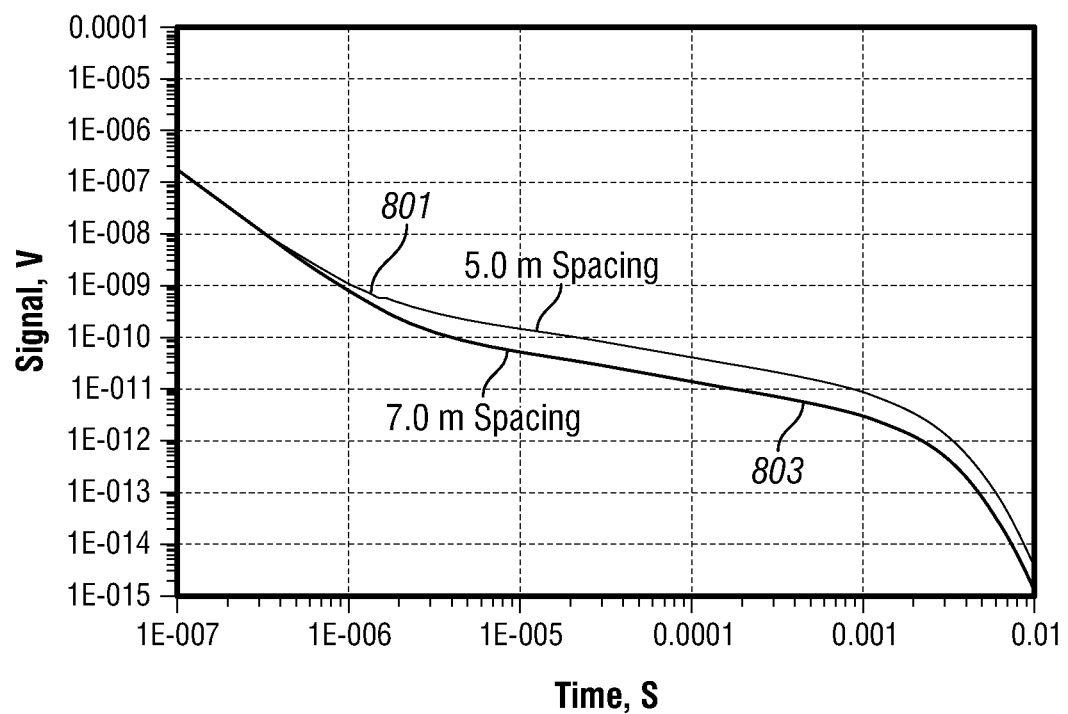
FIG. 8 shows modeling results for the 3-coil arrangement in case when nonconductive inserts are used in the structure without bucking and with no conductive earth formation.

Turning next to FIG. 8, modeling results are shown for the three-coil arrangement in the case when nonconductive inserts are used in the structure without bucking. Signals $C_1(t)$ and $C_2(t)$ are calculated at the distances of 5 m 801 and 7 m 803 from the transmitter when there is no conductive formation in the model (signal in the air). The signals 801, 803 are used to calculate bucking coefficient for the structure with the inserts.

Figure 9:
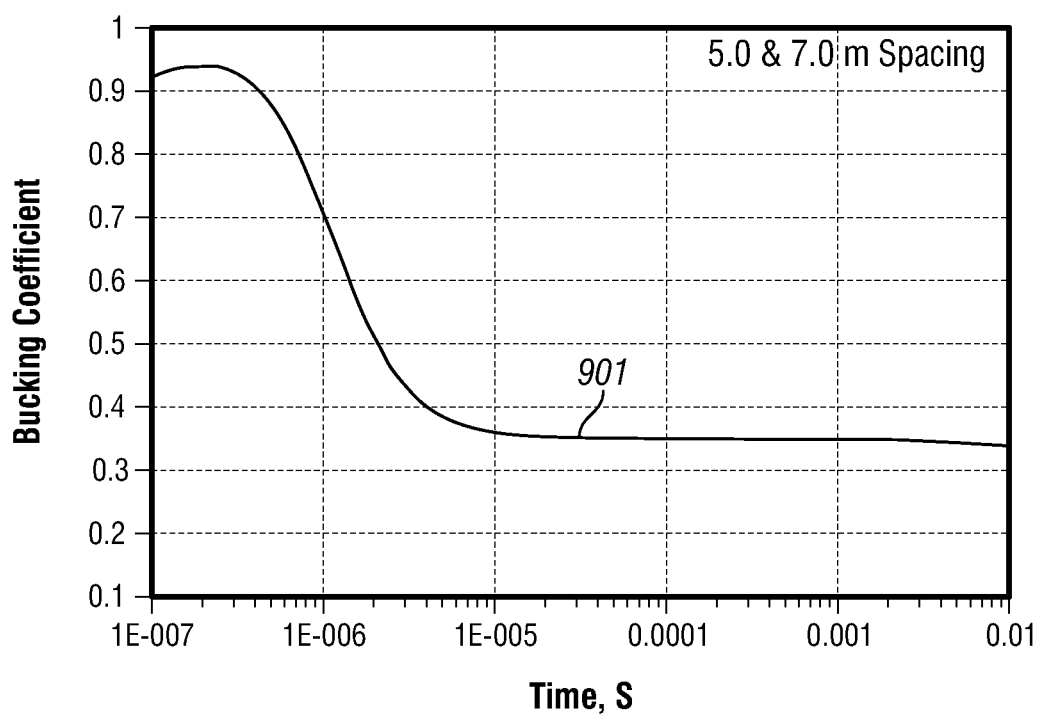
FIG. 9 shows the time dependent bucking coefficient $K(t)=C_2(t)/C_1(t)$ 901 derived from the combination of signals at 5 and 7 m corresponding to the model with nonconductive inserts and no earth formation.

FIG. 9 shows the time dependent bucking coefficient $K(t)=C_2(t)/C_1(t)$ 901 derived from combination of signals at 5 and 7 m correspondingly for the model with nonconductive inserts and no earth formation.

Figure 10:
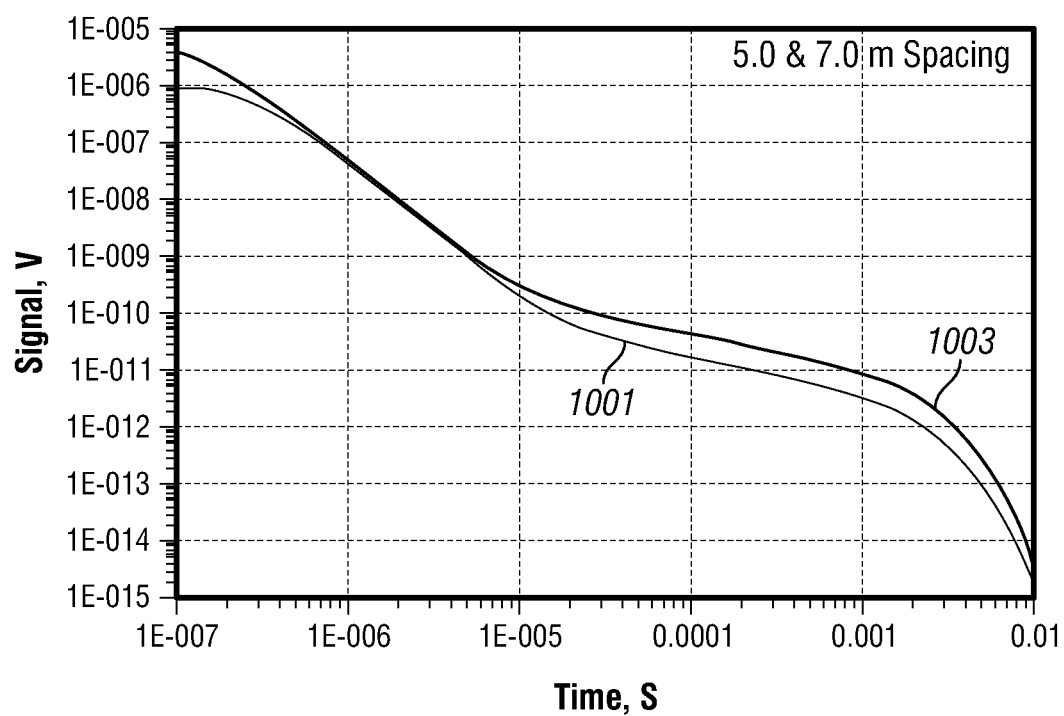
FIG. 10 shows transient unbucked signals for the structure with the inserts for the case when a boundary is placed at the distance of 16 m from the drill bit.

FIG. 10 shows transient unbucked signals for the structure with the inserts for the case when a boundary is placed at the distance of 16 m from the drill bit. The curve 1001 is for the 7 m spacing and the cure 1003 is for the 5 m spacing.

Figure 11:
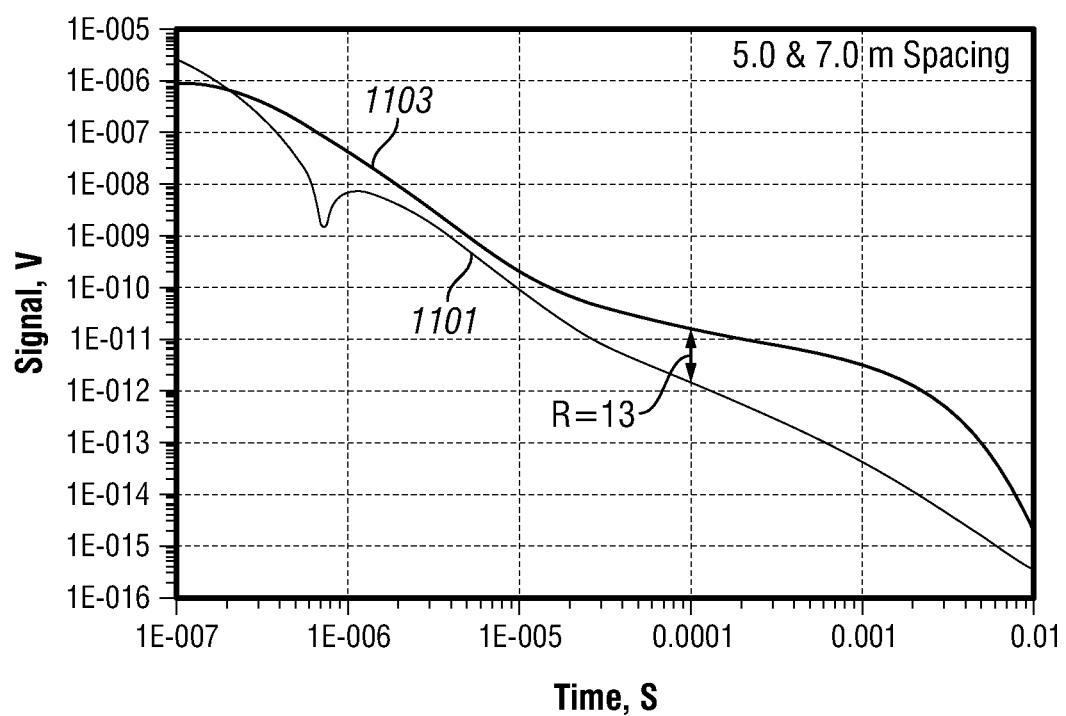
FIG. 11 shows transient bucked signal for the model of FIG. 10.

The results of bucking with inserts are shown in FIG. 11. From FIG. 11, it can be seen that the ratio between the signal from the drill pipe 1103 and the formation 103 went down to a factor R=13 at the time of 100 $\mu$s. This is an improvement by a factor of 50 over the ratio of R=680 in FIG. 7 when no nonconductive inserts are used.

Figure 12:
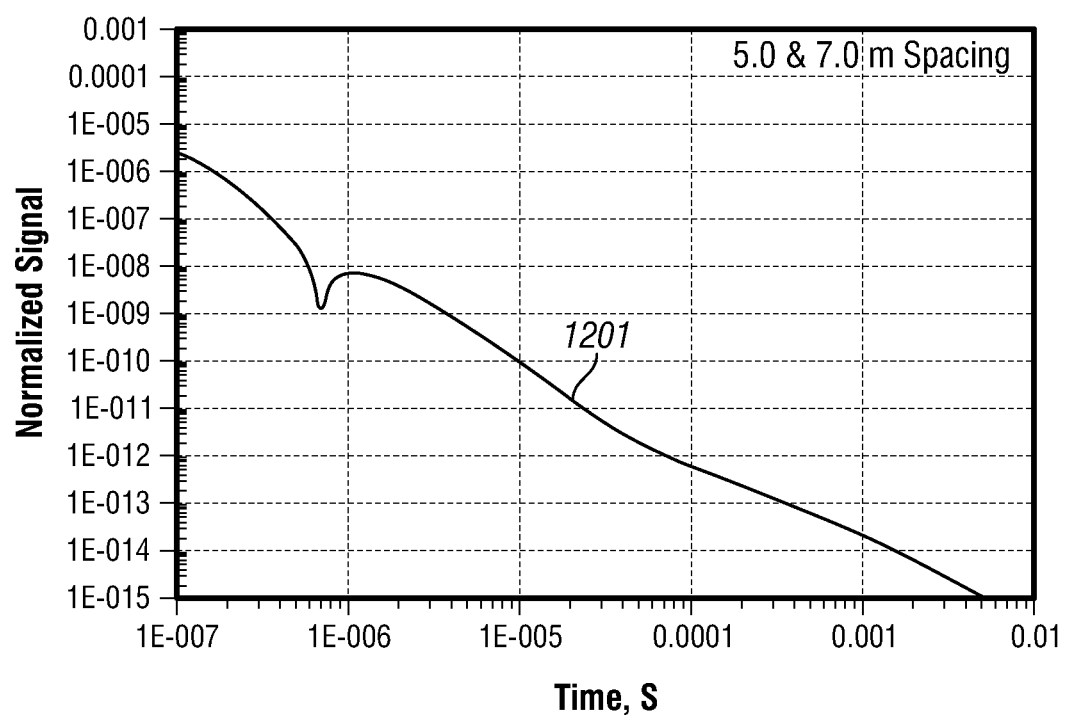
FIG. 12 shows a comparison of 1-D modeling for a response with no conductive pipe and a bucked response with nonconductive inserts with a conductive pipe.

Finally, a comparison is shown between a bucked signal with inserts in the presence of conductive drill pipe with the signal in the absence of a conductive drill pipe. This is shown in FIG. 12. The first model includes a conductive drill pipe with short inserts, while the second model has no drill pipe. As can be seen from the figure, the two normalized (by the corresponding transmitter/receiver moments) signals 1201 coincide almost all over the time interval of interest. This suggests that the bucked signal for the model with the drill pipe and nonconductive inserts has the same shape as the signal in the absence of drill. Hence 1-D responses (of a model with no drill collar) can be used for interpretation of the 2-D (or 3-D) responses (of models with pipe and inserts). This is an important practical fact, since modeling of 1-D response is much simpler to perform than modeling of 2D/3D responses.

The processing of the data may be done with the use of a computer program implemented on a suitable computer-readable medium that enables the processor to perform the control and processing. The term processor as used in this application is used in its traditionally-broad sense and is intended to include such devices as single-core computers, multiple-core computers, distributed computing systems, field programmable gate arrays (FPGAs) and the like. The computer-readable medium referenced in this disclosure is any medium that may be read by a machine and may include magnetic media, RAM, ROM, EPROM, EAROM, flash memory and optical disks. The processing may be done downhole or at the surface. In an alternative embodiment, part of the processing may be done downhole with the remainder conducted at the surface.

While the foregoing disclosure is directed to the preferred embodiments of the disclosure, various modifications will be apparent to those skilled in the art. It is intended that all such variations within the scope and spirit of the appended claims be embraced by the foregoing disclosure.

What is claimed is:

1. An apparatus for evaluating an earth formation, the apparatus comprising:
   a carrier including at least one transmitting antenna and at least two spaced-apart receiving antennas configured to be conveyed in a borehole, the carrier including a conductive tubular and a non-conductive insert in the conductive tubular encompassing at least one of (i) the at least one transmitter antenna, and (ii) the at least two spaced-apart receiver antennas; and
   at least one processor configured to:
      estimate a value of a resistivity property of the earth formation using first and second transient signals produced by a first one and a second one of the at least two spaced-apart receiver antennas respectively responsive to a transient activation of the at least one transmitter antenna.

2. The apparatus of claim 1 wherein the at least one processor is further configured to estimate the resistivity property of the earth formation using a time-dependent coefficient relating a transient response of the first one of the at least two spaced-apart receiver antennas to a transient response of the second one of the at least two spaced-apart receiver antennas to a transient activation of the at least one transmitter antenna in a homogenous medium.

3. The apparatus of claim 1 wherein the resistivity property of the earth formation is selected from: (i) a resistivity of the formation, (ii) a conductivity of the formation, and (iii) a dielectric constant of the formation.

4. The apparatus of claim 1 wherein:
   the carrier further comprises a bottomhole assembly;
   the resistivity property of the earth formation further comprises a distance to an interface in the earth formation, and
   the at least one processor is further configured to control a direction of drilling of the bottomhole assembly using the estimated value of the distance to the interface.

5. The apparatus of claim 4 further comprising a drilling tubular configured to convey the bottomhole assembly into the borehole.

6. The apparatus of claim 1, wherein the transmitter further comprises at least one coil oriented so as to induce a magnetic moment in one of (i) a longitudinal axis parallel to an axis of said tubular, and (ii) a direction inclined to said longitudinal axis.

7. The apparatus of claim 1 wherein the at least one processor is further configured to estimate the value of the resistivity property of the earth formation by using an inversion in which 1-D modeling is done without using a conductive tubular.

8. The apparatus of claim 1 wherein the nonconductive insert has a length less than 1 m.

9. A method of evaluating an earth formation, the method comprising:
   conveying a carrier including at least one transmitting antenna and at least two spaced-apart receiving antennas configured in a borehole, the carrier including a conductive tubular and a non-conductive insert in the conductive tubular encompassing at least one of (i) the at least one transmitter antenna, and (ii) the at least two spaced-apart receiver antennas;
   activating the at least one transmitter and producing first and second transient signals in a first one and a second one of the at least two receiver antennas respectively; and
   using at least one processor for:
      estimating a value of a resistivity property of the earth formation using the first transient signal and the second transient signal.

10. The method of claim 9 further comprising using the at least one processor to estimate the resistivity property of the earth formation by using a time-dependent coefficient relating a response of the first one of the at least two spaced-apart receiver antennas to a response of the second one of the at least two spaced-apart receiver antennas to an activation of the at least one transmitter antenna in a homogenous medium.

11. The method of claim 9 further comprising using the at least one processor to estimate a resistivity property selected from: (i) a resistivity of the formation, (ii) a conductivity of the formation, and (iii) a dielectric constant of the formation.

12. The method of claim 9 further comprising:
   using, for the carrier, a bottomhole assembly; and
   using the at least one processor for:
      estimating, as the resistivity property of the earth formation, a distance to an interface in the earth formation, and
      controlling a direction of drilling of the bottomhole assembly using the estimated value of the distance to the interface.

13. The method of claim 12 further comprising using a drilling tubular for conveying the bottomhole assembly into the borehole.

14. The method of claim 9, further comprising using, for the at least one transmitter, a transmitter having at least one coil oriented to induce a magnetic moment in one of (i) a longitudinal axis parallel to an axis of the tubular, and, (ii) a direction inclined to the longitudinal axis.

15. The method of claim 9 wherein using the at least one processor for estimating the value of the resistivity property further comprises performing an inversion using a one-dimensional model without a conducting tubular.

* * * * *